Figure 1:
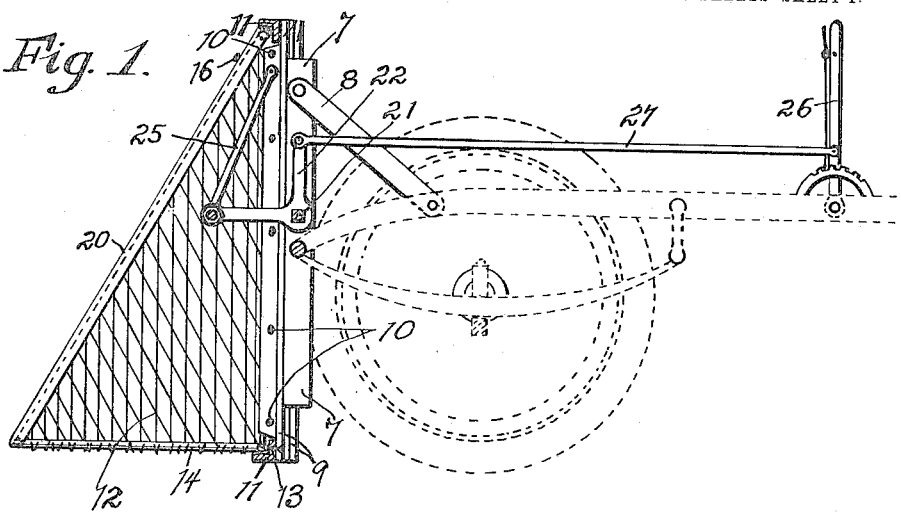

W. B. COLE.
AUTO FENDER.
APPLICATION FILED OCT. 17, 1912.

1,123,848.

Patented Jan. 5, 1915.

2 SHEETS—SHEET 1.

Witnesses:
T. Colson
C. E. Wessels

Inventor:
William B. Cole,
By Joshua R. H. Potts
his Attorney.

W. B. COLE.
AUTO FENDER.
APPLICATION FILED OCT. 17, 1912.
1,123,848.
Patented Jan. 5, 1915.
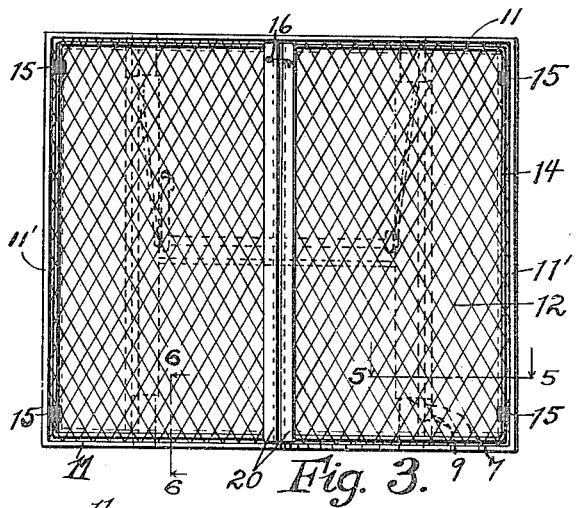
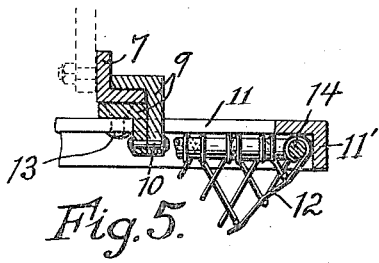
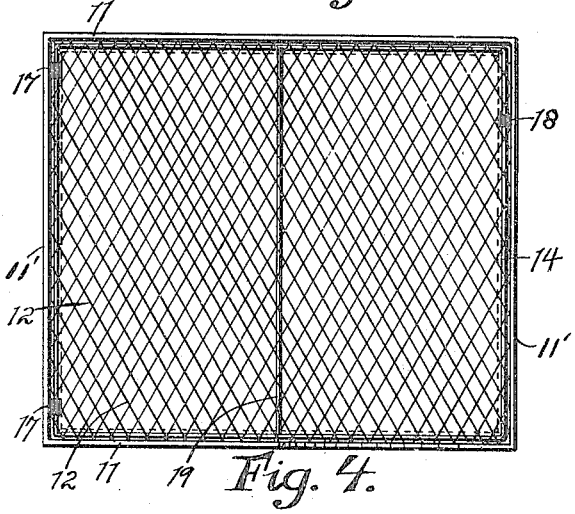
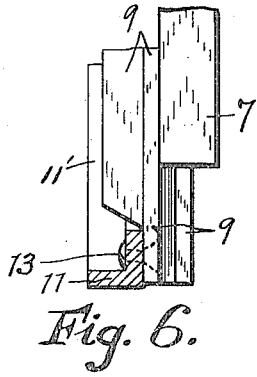
Witnesses:
T. Colson,
C. E. Wessels.
Inventor:
William B. Cole,
By Joshua R. H. Potts
his Attorney.

UNITED STATES PATENT OFFICE.

WILLIAM B. COLE, OF CHICAGO, ILLINOIS, ASSIGNOR OF ONE-FOURTH TO GLEN C. WEBSTER AND ONE-FOURTH TO ERNEST M. WARFFUEL, OF CHICAGO, ILLINOIS.

AUTO-FENDER.

1,123,848.  Specification of Letters Patent.  Patented Jan. 5, 1915.

Application filed October 17, 1912. Serial No. 726,238.

*To all whom it may concern:*

Be it known that I, WILLIAM B. COLE, a citizen of the United States, and a resident of the city of Chicago, county of Cook, and State of Illinois, have invented certain new and useful Improvements in Auto-Fenders, of which the following is a specification.

My invention relates to vehicle fenders and particularly to fenders for motor driven vehicles and the object is to provide a device of the character mentioned, formed substantially as described hereinafter and shown in the drawings.

A further object is to produce a device of this character which will be simple of construction and efficient in operation.

Other objects will appear hereinafter.

The invention consists in the combinations and arrangements of parts hereinafter described and claimed.

Figure 2:
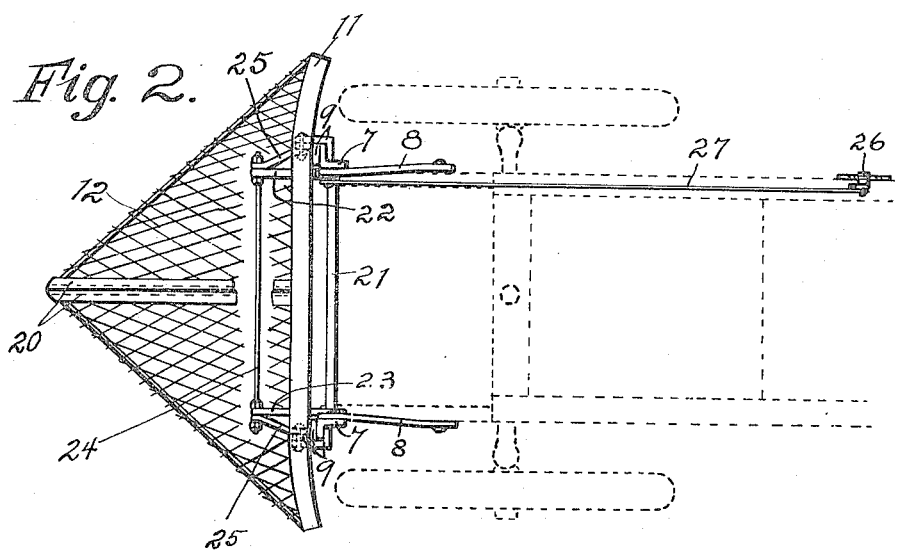

The invention will be best understood by reference to the accompanying drawings forming a part of this specification, and in which, Figure 1 is a central vertical section of a device embodying my invention and illustrates the method of applying it to a motor vehicle, Fig. 2 is a plan view of the same, Fig. 3 is a front elevation of the device, Fig. 4 is a front elevation of a slightly modified form of fender, Fig. 5 is a section taken on line 5—5 in Fig. 3, and Fig. 6 is a section taken on line 6—6 in Fig. 3.

The preferred form of construction, as illustrated in the accompanying drawings, comprises two vertical guides, each guide being an angle bar and having one of its legs in parallel relation with one leg of the other guide and the other legs of both guides extending outwardly or away from each other. Said guides 7 are secured to the forward end of a vehicle by means of the bolts which connect the forward end of the frame and front springs of said vehicle. Braces 8 are secured to the upper end portions of guides 7 and to the frame of the vehicle (see Figs. 1 and 2) and are adapted to maintain said guides in vertical positions.

Slidably mounted on the outwardly extending legs of the angle bar guides 7 are guideways 9, each comprising two angle bars having two of their legs secured together by rivets 10 and their other legs spaced apart and engaging one of the guides 7, see particularly Fig. 5.

A rectangular supporting frame is made up of sides comprising horizontal angle bars 11 and vertical angle bars 11' joined together at their adjacent ends in any desirable manner, such as welding or riveting. Each of the angle bars in said supporting frame is disposed with one of its legs extending forwardly of the vehicle and its other leg extending inwardly of the frame in a manner to provide a space between said forwardly extending legs for the reception of a fender covering 12 and its frame 14. The horizontal angle bars 11 of the supporting frame are secured to the guideways 9 by rivets 13 forming a rigid connection between the supporting frame and said guideways.

The fender covering 12 is preferably formed of woven wire, but may be of any suitable substance, and is secured to a frame 14, made up of rod or tubing, by having its edge portions turned around said rod or tubing, see Figs. 1, 2 and 5. The top and vertical edges of covering 12 and the top and vertical sides of frame 14 are disposed in the corresponding sides or between the legs of the angle bars of said supporting frame and the bottom edge of covering 12 and bottom side of frame 14 are extended forwardly of the lower bar 11 of the supporting frame and in substantially the same horizontal plane therewith, thereby inclining a part of said covering in one plane and another part thereof in a different plane, see Figs. 1 and 2.

In Figs. 1, 2 and 3, the fender covering 12 and frame 14 are shown as divided in their central portions and hinged as at 15, to angle bars 11', with a latch 16 provided at their adjacent edges locking them in operative conditions. In Fig. 4, the covering 12 and frame 14 are indicated in the same general forms but each formed integrally with hinges 17 pivotally connecting the vertical edge and side respectively thereof to one of said angle bars 11' and with a latch 18 locking their other vertical side and edge respectively to the other angle bar 11'. In the last mentioned form a rod 19 is provided at the central portion of frame 14 to stiffen the central portion of cover 12 and in the first mentioned form angle bars 20 are secured along the adjacent edges of the parts of covering 12 and frame 14 for a like purpose.

With a construction as set forth then it will be observed that upon releasing latch 16 in the first mentioned form or latch 18 in the second mentioned form of covering 12 and frame 14, said frame and covering may be swung on their hinges to get to the front part of the vehicle. Also a strong and efficient fender for the purpose mentioned is provided.

A shaft 21 is journaled in a suitable housing in the guides 7 and is preferably square in cross-section. Upon such shaft, near one of said guides 7, is a bell crank lever 22, and at the other end of the shaft is a lever 23, both secured on such shaft to turn therewith. The free end of said lever 23 and one end of the bell crank lever 22 are connected by means of a rod 24, and pivotally secured on said rod 24 are connecting links 25 connecting said lever and bell crank lever with the angle bars of the guide-ways 9 to effect reciprocation of the angle bar supporting frame vertically. The other end of the bell crank lever 22 is connected with a manually operative lever 26 by means of a connecting rod 27 to effect vertical movement of the fender.

In operation an operator moves the lever 26 forwardly to lower the fender to its operative position and move such lever 26 rearwardly to raise the fender, as will be readily understood.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A fender comprising a substantially rectangular frame made up of two vertical angle bars and two horizontal angle bars joined at their adjacent ends with one leg of each angle bar extending forwardly and the other leg extending inwardly of the frame; a rod having a portion bent to conform with the outline of the upper horizontal and vertical angle bars of said frame and disposed in the angular space between the legs of the same, and a portion bent in angular form, extending forwardly of and in the same horizontal plane with the lower horizontal angle bar of the frame; a covering having its edges turned around said rod and extending between the latter and certain of the angle bars of said frame; and hinges connecting said covering with said frame, substantially as described.

2. A fender comprising a substantially rectangular inner frame made up of two vertical angle bars and two horizontal angle bars joined at their adjacent ends with one leg of each angle bar extending forwardly and the other leg extending inwardly of the frame; a deflecting element consisting of two parts, each of said parts comprising a rod having a portion bent to conform with the outline of the upper horizontal and vertical angle bars of said frame and disposed in the angular space between the legs of the same, and a portion bent in angular form, extending forwardly of and in the same horizontal plane with the lower horizontal angle bar of said frame; a covering for each of said deflecting element parts having its edges turned around the corresponding rod; and hinges connecting the outer edges of said deflecting element parts with the corresponding vertical bars of said frame, the inner edges of said deflecting element parts adjoining each other loosely, substantially as described.

In testimony whereof I have signed my name to this specification in the presence of two subscribing witnesses.

WILLIAM B. COLE.

Witnesses:
 Joshua R. H. Potts,
 Brayton G. Richards.

Copies of this patent may be obtained for five cents each, by addressing the "Commissioner of Patents, Washington, D. C."